United States Patent
Grieb et al.

(10) Patent No.: US 6,904,388 B2
(45) Date of Patent: Jun. 7, 2005

(54) METHOD FOR PREVENTING OR MINIMIZING OPERATIONAL FAILURES IN A TECHNICAL INSTALLATION

(75) Inventors: Herbert Grieb, Malsch (DE); Karl-Heinz Kirchberg, Karlsruhe (DE); Edmund Linzenkirchner, Eggenstein-Leopoldshafen (DE); Erich Merz, Rheinzabern (DE); Robert Schwab, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/684,561

(22) Filed: Oct. 15, 2003

(65) Prior Publication Data

US 2004/0162705 A1 Aug. 19, 2004

Related U.S. Application Data

(63) Continuation of application No. PCT/DE02/04030, filed on Oct. 28, 2002.

(30) Foreign Application Priority Data

Nov. 8, 2001 (DE) ........................................ 101 54 482

(51) Int. Cl.⁷ ................................................ G06F 11/00
(52) U.S. Cl. ...................................... 702/185; 324/500
(58) Field of Search ........................ 702/185, 182–184, 702/58, 59; 324/500, 511, 514

(56) References Cited

U.S. PATENT DOCUMENTS

| | | | | |
|---|---|---|---|---|
| 5,210,704 A | * | 5/1993 | Husseiny | 702/34 |
| 6,095,793 A | * | 8/2000 | Greeb | 431/12 |
| 6,609,212 B1 | * | 8/2003 | Smith | 714/4 |
| 2003/0084359 A1 | * | 5/2003 | Bresniker et al. | 713/324 |

FOREIGN PATENT DOCUMENTS

| | | |
|---|---|---|
| DE | 40 08 560 A1 | 9/1990 |
| DE | 43 35 256 A1 | 4/1994 |
| EP | 0 509 817 A1 | 10/1992 |
| EP | 0 612 039 A2 | 8/1994 |
| EP | 0 626 697 A1 | 11/1994 |
| EP | 0 908 805 A1 | 4/1999 |

* cited by examiner

*Primary Examiner*—Edward Raymond
(74) *Attorney, Agent, or Firm*—Sughrue Mion, PLLC

(57) ABSTRACT

A method for preventing or minimizing operational failures in a technical installation (1) is disclosed, in which, in accordance with influence quantities (17) accessible by a control system, at least one criterion (18–20) is defined so as to forecast an impending failure of one or more parts of the installation. This criterion is constantly monitored at short time intervals so as to establish a forecast of the expected failure probability. This forecast makes it possible, if necessary, to take early countermeasures (21–23) for preventing the failure of the installation or to take steps for minimizing the effects of the imminent failure.

19 Claims, 1 Drawing Sheet

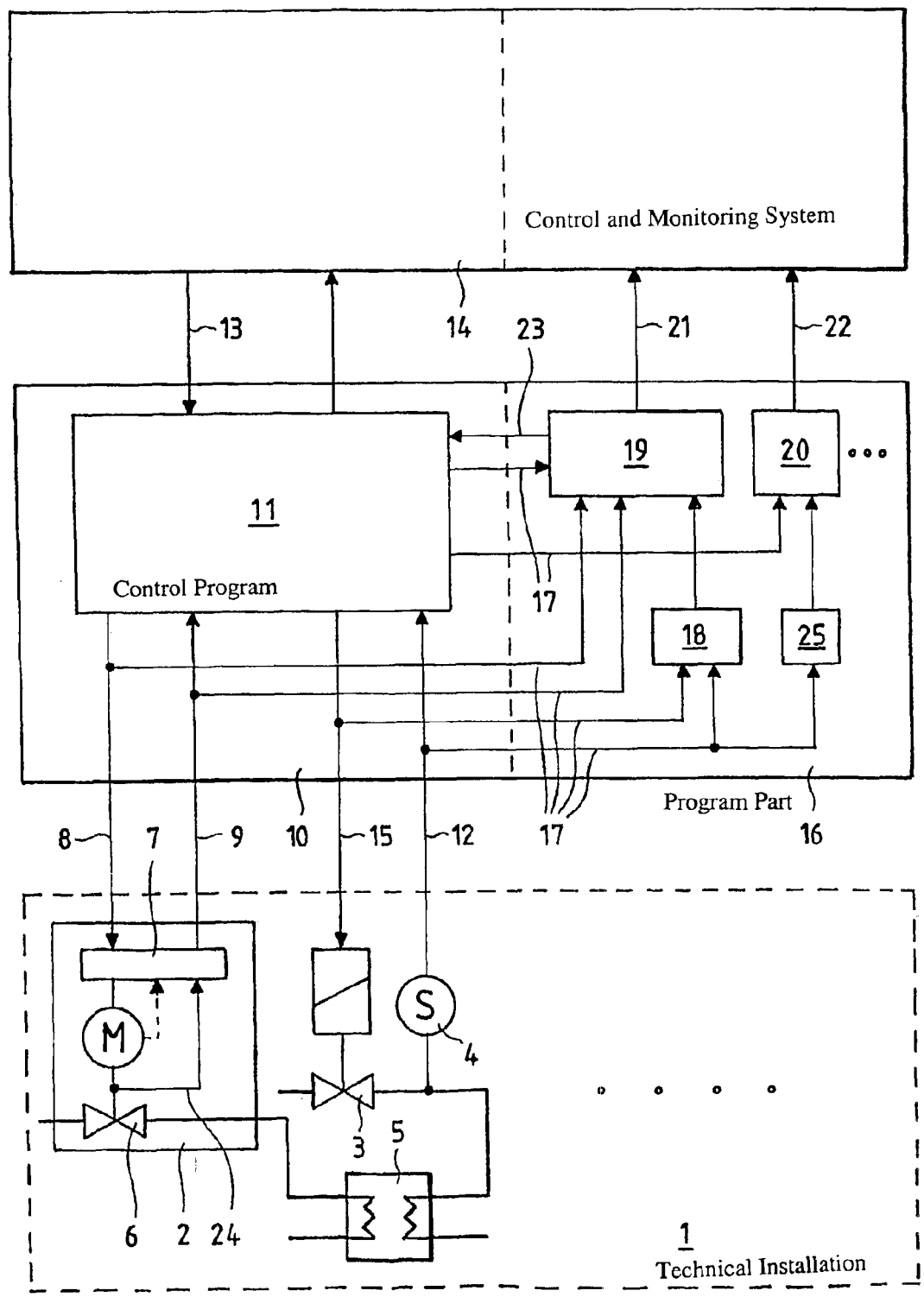

METHOD FOR PREVENTING OR MINIMIZING OPERATIONAL FAILURES IN A TECHNICAL INSTALLATION

This is a Continuation of International Application PCT/DE02/04030, with an international filing date of Oct. 28, 2002, which was published under PCT Article 21(2) in German, and the disclosure of which is incorporated into this application by reference.

FIELD OF AND BACKGROUND OF THE INVENTION

The invention relates to a method for preventing or minimizing operational failures in a technical installation. At least one criterion is defined by means of influence quantities that are accessible to a control system. In particular, these influence quantities are monitored installation quantities and/or other influences. More specifically, the other influences are, e.g., external influences. The presence of that criterion is used to forecast an impending operational impairment and/or an impending failure of one or more parts of the installation. This criterion is constantly monitored at short time intervals in order to generate a forecast of the expected failure probability and/or the operational impairment. The forecast is used, if necessary, to take or prompt early countermeasures to prevent the failure and/or the operational impairment. The forecast is also used, if necessary to take steps for minimizing the effects of the impending failure and/or the operational impairment. The criterion used for the forecast is derived from the respective installation quantities in such a way that irregularities are detected at a time when none of the installation quantities have exceeded a limit that would require the immediate shutdown of the installation or a part thereof.

Humans continue to learn to control and profitably use increasingly complex technical processes. This is made possible, in particular, by the wide use of automated controls, which assume highly complex open-loop and closed-loop tasks in normal operation. However, with the increasing complexity of technical installations, the failure probability of the technical installations also increases, since the failure probabilities of the relevant installation components are additively superimposed. The failure probability of the entire installation thus increases with the number of its relevant components. Despite this increasingly serious problem of limited availability of complex installations, an effective solution to this problem has thus far not been proposed. The shortening of maintenance intervals has its limits because of the increased downtimes required to carry out the maintenance. Commercially available diagnostic programs, which are used to quickly localize errors or malfunctions in an installation, can be activated only after an error or malfunction has occurred, i.e., when the installation may already be down. In other words, the error or malfunction is dealt with only after it has occurred, which is an outcome of the worldwide causality principle. Even the latest diagnostic programs cannot prevent long downtimes because the rapid repair required in the case of an acute failure depends on completely different factors, such as the availability of special replacement parts.

German Laid Open Publication DE 40 08 560 A1 discloses a method for determining the remaining life of a unit that is composed of a plurality of components and that has at least one function. The calculations are performed, for example, to determine whether inspection or maintenance measures can be delayed by one or more years. An expert system is used for these calculations, which includes an information acquisition support device, an inference device, a user interface, an external interface and an information bank. Thus, this is a very complex method with respect to the required hardware, especially if a very large amount of information is to be recorded and processed, so that the information acquisition support device becomes very large.

EP 0 509 817 A1 has a similar disclosure, except that only the remaining life of a cutting tool needs to be determined, and the size of the expert system, in particular the number of sensors required by the expert system, is thus kept within limits.

EP 0 908 805 A1 teaches a more or less complex device for pre-emptive maintenance purposes. Furthermore, this device becomes active only at one-hour intervals in order to check whether maintenance is due by means of average values of the data stored, respectively, during the past hour. This may be sufficient for conventional maintenance intervals of e.g., one or several years so as to detect wear-related aging processes. In practice, however, one finds that acute problems occur too, which are caused, for example, by incorrect operation or the like. There, such a slow response is not sufficient to avert major damage.

EP 0 626 697 A1 relates to a plant monitoring and diagnosing method and a plant equipped therewith. As shown in FIG. 7 and FIG. 11 of EP 0 626 697 A1, the diagnostic system is coupled with the control system. The data flow, however, is directed only from the diagnostic system to the control system, so that the diagnostic system requires its own hardware, including its own sensors and/or evaluation circuits for sensor signals, which is comparatively expensive.

Finally, EP 0 612 039 A2 teaches a maintenance system that takes the wear of components in a plant into account. The method disclosed therein includes determining, as precisely as possible, the expected life of individual components of a plant, taking into account the concrete operation conditions. The introduction of this reference shows, however, that this reference focuses on developing and designing new, low-maintenance plants. Insofar, the system presented is not executed in real time and can therefore not be used to monitor a finished plant. Such a system includes a memory and computation and display means and can be connected to a monitoring system of a specific plant. This makes it possible to optimize the computations. However, here too, the system requires its own hardware, which makes its use uneconomical in many cases.

OBJECTS OF THE INVENTION

It is an object of the present invention to significantly increase the availability of technical installations at the lowest possible cost. It is to be noted that, especially in small, automated systems, every additional component required for such a method is viewed as uneconomical because no increase in productivity is evident during normal operation of the installation.

SUMMARY OF THE INVENTION

According to one formulation of the present invention, this and other objects of the invention is achieved by a method for preventing or minimizing operational failures in a technical installation, which defines at least one criterion in accordance with influence quantities that are accessible by a control system of the technical installation. Therein, a presence of the criterion constitutes a forecast of an impending operational impairment or an impending failure of the technical installation or of components of the technical installation. The criterion is monitored at defined time intervals so as to establish a probability forecast of the impending operational impairment or of the impending failure.

If necessary, in accordance with the probability forecast, early countermeasures to prevent the impending operational impairment or the impending failure are implemented or prompted to be implemented. Further, if necessary, in accordance with the probability forecast, steps to minimize the effects of the impending operational impairment or the impending failure are implemented.

The criterion is derived from the influence quantities such that irregularities in the technical installation are detected before any of the influence quantities exceeds a limit that requires an immediate shutdown of the technical installation or of at least one of the components of the technical installation. In addition, in accordance with the current installation quantities of the technical installation, the control system determines the criterion almost undelayed, and, thus, in real-time. Also, the criterion is implemented in a function block, which is, in addition to a control program, stored in a programmable controller, and an expected failure of the technical installation or of one of the components thereof is signaled to a control-and-monitoring station.

Thus, the invention turns away from the globally applicable causality principle according to which a reaction (repair) follows only after an action (failure of a part of an installation or a fault or an error). An effective forecast anticipates the occurrence of future faults, so that the reaction, namely the correction of possible causes of the fault, can be introduced before the actual action, namely the occurrence of the fault, to ensure smooth functioning of the respective part of the installation. It is a great advantage, in this context, to be able to see as far into the future as possible in order to have as much time as possible to respond to an anticipated failure of a part of an installation. Thus, the required repair or maintenance can be performed unhurriedly.

This leaves enough time, for example, to order replacement parts or to wait for a suitable moment to install a replacement part. The forecast is based on prognostics, i.e., indicators, which lead one to expect a reduced working life of a specific part of the installation based on technical/scientific considerations. The accuracy of the forecast according to the invention thus stands and falls with a precise definition of the criteria used as the prognostics.

Often, an exact forecast can be provided only shortly before an installation part fails, i.e., when the indicators of an impending failure increase or become clearer. On the other hand, even based on experience, it is often sufficient to realize that certain operating conditions reduce the working life of a component. This can be determined, for example, based on deviations of certain process quantities from the nominal values defined therefor, so that the operating conditions can be restored to normal by performing an early installation maintenance measure, and/or, if necessary, by early replacement of a component at risk.

Ideally, a criterion to be monitored for the forecast can be defined from installation quantities that are known anyway because these installation quantities are measured for controlling the installation. If one or more of the relevant quantities is/are not available, an estimate may be made based on other, known quantities or—in important cases— an additional sensor may be used. In contrast to emergency shutdowns caused by limit values that are being exceeded, the forecasting method according to the invention works with "soft" criteria, which normally still move within the permissible tolerance range. Conceivable are safe but clear deviations from defined nominal values of certain operation quantities (e.g., continuously elevated moisture levels in the area of switchgear); a strong tendency toward changes in the direction of critical values (e.g., a rapid temperature increase within the permissible temperature range); and dangerous combinations of different operation parameters (e.g., if the inflow into a largely filled container clearly exceeds its outflow).

The method according to the invention can be carried out by a separate computer. However, a pure software solution within existing hardware components has the advantage, for example, that substantially expanded safety measures can be implemented when, within a routine update, the control program for an automation system and/or a control and monitoring system is updated. Thus, this implementation of the substantially expanded safety measures is hardly noticeable to the operator of the installation. By installing additional hardware components, a respective test phase can also be shortened or be eliminated altogether. If the automation system of the corresponding technical installation is used to define a prognostic, the data transmission via a corporate data network needs very little modification. In normal operation, a higher-level control and monitoring system "sees" no change compared to the previous operation, and a respective message is sent only in case of anticipated problems. On the other hand, the forecast can take place in almost undelayed manner, because there is no wait for data to be transmitted via a network before an evaluation takes place. As a result, this variant of the method is particularly suitable for fast processes that may require a fast response or for processes with many quantities and a correspondingly large amount of information.

By monitoring the criterion, which is used as a prognostic, at short time intervals, particularly at intervals of less than a second (and, thus, in real time), operating characteristics that indicate operational failures can be detected and analyzed early, so that a maximum amount of response time remains.

Since the criterion is implemented in the context of one or more function blocks that are added to a control program of an automation system, the respective function blocks can be executed or processed once with every computation cycle of the automation system. This requires, however, that the computation steps necessary to establish a forecast are not substantially prolonged and thereby cause the control itself to become noticeably more sluggish. In that case, the respective function blocks or their execution can also be distributed, in the manner of a task and over a plurality of interval periods, between individual computation cycles of the control program. In the automation system or the control device, all the information is available in almost undelayed manner.

The invention makes it possible to take changing trends of one or more influence quantities into account when the criterion is monitored. The term "influence quantity" should be interpreted broadly. For example, one could think of rapidly rising temperatures within a switch cabinet, which may indicate, on the one hand, e.g., the operational failure of a device or the failure of a fan, and which, on the other hand, can lead to sizeable (consequential) damage if no countermeasures are taken.

Furthermore, when the criterion is monitored, a plausibility analysis may be conducted between two or more influencing quantities. This makes it possible to expect non-detected faults, e.g., if a sensor arranged downstream of a valve does not detect any flow even though the control has issued a command to open that valve. However, these analyses can also be far more complex. For example, these analyses include comparisons with operating quantities that the control determines by means of a stored computation model.

The forecast of the expected failure probability can be used to estimate the remaining run time of the installation and/or the degree of operational impairment of the installation that results from the failure, so that the type of countermeasures and/or steps to be taken can be determined. The spectrum of the possible responses includes a shortened maintenance interval of a specific part of the installation; immediate replacement of a faulty or jeopardized installation component; operating the installation at reduced capacity to protect one or more components; and an immediate precautionary shutdown to prevent possibly worse damage.

If, for example, the remaining runtime is long and/or the operational impairment of the installation resulting from the failure is only minor, it may be justified simply to arrange for early maintenance for the time being, e.g., to lubricate roller bearings of a machine if the power consumption of the drive motor has continuously and noticeably increased. Until the point when the early maintenance is performed, however, estimates with respect to the remaining runtime are continuously repeated. As soon as a noticeable reduction occurs or as soon as less than a predefined minimum runtime remains, more decisive countermeasures or steps need to be taken.

If the forecast predicts a moderate remaining runtime and/or a moderate operational impairment of the installation resulting from the failure, the parts of the installation that are at risk of failure or that are causing the deteriorated operating conditions should be repaired immediately. This could be the case if an important valve fails to open or close within a specified time period.

If the forecast indicates a short remaining runtime and/or a serious operational impairment of the installation that results from an impending failure of a component, the control may be used to intervene in the process directly so as to relieve as far as possible the parts of the installation that are at risk of failure. This can be achieved by postponing activities of the affected parts of the installation until the last date tolerated by the production PERT chart. Here, the main objective is to protect the installation if the production plan allows for a temporary shutdown of the respective part of the installation. This step can be completely automated or simply be proposed to a monitoring staff member who must then make the decision. At the same time, an immediate correction or repair of the impairments should be ordered.

A forecast according to the invention may be supplemented by an investigation of the probable cause of the failure and, where applicable, its effect on other parts of the installation. This makes it possible to identify and, if necessary, to immediately order replacement parts that are expected to be required, if these parts are not in stock. This supports the maintenance personnel by making available all the replacement parts required to correct the problem.

Finally, it falls within the teaching of the invention that the execution of the method according to the invention is assigned to a combination of an automation system and a control and/or monitoring system. Since control-and-monitoring systems are released of actual control tasks, their computing capacity, for the most part, is not fully utilized. As a result, even complex calculations can be executed here, e.g., complex consistency analyses in the form of comparisons with the results of stored computational models of the respective installation or the like. In this context, the monitoring of individual criteria that are used as prognostics can be implemented within an evaluation program of the control-and-monitoring system. A failure criterion can be checked each time a set of new measured values of relevant installation quantities is received. Although it may be necessary to report a plurality of operating quantities continuously to the control-and-monitoring system in order to analyze complex criteria, this does not present a problem in view of the transmission speeds of standard networks.

BRIEF DESCRIPTION OF THE DRAWINGS

Other features, details, advantages and effects based on the invention will become clear from the following description of an exemplary embodiment of the invention and from the drawing. The single FIGURE shows a control system of a technical installation whose functionality, which is originally confined to controlling the installation, is expanded by the method according to the invention for prevent or minimizing operational failures of the installation.

DETAILED DESCRIPTION OF THE PREFERRED EMBODIMENTS

The drawing schematically shows a section of a technical installation 1. An "intelligent" valve 2, an ordinary solenoid valve 3, a flow rate sensor 4, and a heat exchanger 5 are representative of the plurality of installation components. In contrast to the ordinary valve 3 or the sensor 4, the intelligent valve 2 includes, in addition to the motor-driven valve 6, one or more internal sensors 24. The intelligent valve 2 also includes an integrated evaluation unit 7 to perform a self-diagnosis and, where applicable, to return a signal 9 indicating a malfunction to an automation system 10. This automation system 10 stores the a control program 11. Based on different input signals 9, 12 of the installation 1 and, where applicable, based on default signals 13 of a higher-level control-and-monitoring system 14, the control program 11 generates control signals 8, 15 for the different installation control elements 2, 3 and thereby controls the process carried out in the installation 1 in the desired manner. This interplay of the installation 1, the automation system 10, and the control-and monitoring-system 14 is in accordance with the prior art.

To carry out the method according to the invention, a separate program part 16 is provided within the automation system 10. This separate program part 16 accepts internal and external information 17 and information of the automation program 11 as input quantities and uses this information to make forecasts if possible, impending failures of the installation components 2–5. For this purpose, the information 17 is monitored in specially configured function blocks 18–20 with respect to certain criteria, the results of which can be used as prognostics, i.e., as indicators of impending operational failures of the installation 1.

Such function blocks 18–20, 25 may have several hierarchical levels. The lowest level includes, for example, those function blocks 18, 25 which are used to monitor ordinary measuring devices and control elements (e.g., sensors, actuators) for their operational performance via the feedback signals 9, 12. These measuring devices and control elements may (2) or may not (3, 4) be equipped with their own "intelligence."

At a higher functional level, additional criteria 19, 20 are used to make forecasts from the available information on current installation quantities and error conditions of individual components. These forecasts predict whether all the parts of the installation 1 are functioning smoothly so that no failures of individual installation components 2–5 are to be expected; or whether individual components are overloaded because of special conditions, so that there is a threat of premature failure; or whether unusual characteristics of individual installation quantities possibly indicate an impending defect in one or more components. If, for example, the valve 3 is opened via a control signal 15, the flow rate sensor 4 disposed upstream or downstream thereof must indicate a respective flow. If this is not the case, the valve 3 or the sensor 4 may be defective. Using this principle, installation components can be monitored for operation within permissible operating limits even if they are not coupled with the automation system through direct signaling. For example, deposits in the heat exchangers 5 may be detected by means of temperature and flow measurements.

The results of these forecast blocks 19, 20 can be further processed in different ways. If such a forecast shows that a premature failure of one or more components is to be expected but that this failure is likely to occur in the distant future, e.g., within a period of several weeks, this information is relayed (21, 22) to the control-and-monitoring system 14 so as to propose to personnel that early maintenance or short-term repairs should be performed. If, however, the estimated remaining runtime of one or more installation components ranges within a very short time frame of hours or even minutes, the forecast component 16 can act (23) directly on the automation program 11 so as to, e.g., shut down individual installation components as a countermeasure, or so as to operate these components at reduced capacity and to thereby prolong the estimated operating period.

Preferably, the forecast program part 16 is added to the automation program part 11 and is therefore executed with each computation cycle (and, thus, in real time) to enable early detection of impending failures.

If the forecast criteria 18–20 require a greater computation effort, asynchronous computation in the form of a task running in the background may be chosen, or the computation may be executed in the higher-level control and monitoring system 14.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for preventing or minimizing operational failures in a technical installation, comprising:

defining at least one criterion in accordance with influence quantities that are accessible by a control system of the technical installation, wherein a presence of the criterion constitutes a forecast of at least one of an impending operational impairment and an impending failure of the technical installation or of components of the technical installation;

monitoring the criterion at defined time intervals so as to establish a probability forecast of the impending operational impairment or of the impending failure; and in accordance with the probability forecast, at least one of:

(a) implementing or prompting to implement early countermeasures to prevent the impending operational impairment or the impending failure; and (b) implementing steps to minimize effects of the impending operational impairment or the impending failure;

wherein the criterion is derived from the influence quantities such that irregularities in the technical installation are detected before any of the influence quantities exceeds a limit that requires an immediate shutdown of the technical installation or of at least one of the components of the technical installation;

wherein, in accordance with current installation quantities of the technical installation, the criterion is determined in real-time by the control system;

wherein, the criterion is implemented in a function block, which is, in addition to a control program, stored in a programmable controller; and wherein an expected failure of the technical installation or of the at least one of the components of the technical installation is signaled to a control-and-monitoring station.

2. The method as claimed in claim 1, wherein the defined time intervals at which the criterion is monitored are less than one second each.

3. The method as claimed in claim 1, wherein the criterion is monitored at defined points in time.

4. The method as claimed in claim 1, wherein the criterion is processed in cyclical or event-driven manner in a computation cycle of an automation system.

5. The method as claimed in claim 1, wherein change trends of at least one of the influence quantities are taken into account when monitoring the criterion.

6. The method as claimed in claim 1, wherein, when the criterion is monitored, plausibility analyses are conducted between at least two of the influence quantities.

7. The method as claimed in claim 1, wherein, when the probability forecast is established, a remaining runtime of the technical installation, or of a part of the technical installation, or of the components of the technical installation affected by the impending operational impairment or the impending failure is estimated.

8. The method as claimed in claim 1, wherein, when the probability forecast is established, a degree of the impending operational impairment of the technical installation as a result of the impending failure is estimated so as to determine a type of at least one of the countermeasures and the steps.

9. The method as claimed in claim 1, wherein a probable cause of the failure and, where applicable, the effects of the failure on parts of the technical installation or on the components of the technical installation are determined so as to immediately request resources that are expected to be required, if these resources are not available.

10. The method as claimed in claim 9, wherein the resources are selected from the group consisting of replacement parts, personnel, and material.

11. The method as claimed in claim 1, wherein the criterion is implemented in an evaluation program of the control-and-monitoring station, and wherein the criterion is processed in cyclical or event-driven manner.

12. The method according to claim 1, wherein the technical installation is an automated process in a closed-loop control.

13. The method according to claim 1, wherein the technical installation is an automated process in an open loop control.

14. The method according to claim 1, wherein the defining of the at least one criterion is performed only in accordance with the influence quantities available to the control program.

15. A method, comprising:

measuring actual values relating to an operation of components of a technical installation;

determining a criterion value from the measured actual values in real-time so as to detect irregularities in the technical installation before any of the actual values reach a value outside a respective allowed range for the actual values; and based on the criterion value, forecasting a probability of failure of the technical installation or of at least one of the components thereof;

wherein the criterion value is implemented in a function block that is stored in a programmable controller; and wherein an expected failure of the technical installation or of the at least one of the components thereof is reported to a control-and-monitoring station, wherein the actual values consist only of values supplied to a control program controlling the technical installation process.

16. The method according to claim 15, wherein the determining of the criteria value is executed by a computer program running on a programmable controller.

17. The method according to claim 16, wherein:

the computer program is implemented in a plurality of functional blocks comprising low level functional blocks and high level functional blocks, the low level functional blocks receive the measured values from measuring devices and control elements and evaluate operational performance of the measuring devices and the control elements from which the measured values are received, the high level functional blocks evaluate performance of the at least one of the components of the technical installation based on the receive the measured values and data received from the low level functional blocks, the high level functional blocks communicate directly with the control program.

18. The method according to claim 17, wherein the high level functional blocks communicate directly with the control program to instruct the control program to automatically shut down at least one of the components of the technical installation.

19. The method according to claim 17, wherein the high level functional blocks communicate directly with the control program to instruct the control program to automatically slow down operation of at least one of the components of the technical installation.

* * * * *